US008659691B2

(12) United States Patent
Noda et al.

(10) Patent No.: US 8,659,691 B2
(45) Date of Patent: Feb. 25, 2014

(54) SOLID-STATE IMAGING APPARATUS, IMAGING SYSTEM, AND DRIVE METHOD OF SOLID-STATE IMAGING APPARATUS (75) Inventors: Tomoyuki Noda, Kawasaki (JP);
Masaru Fujimura, Sagamihara (JP);
Shintaro Takenaka, Yokohama (JP);
Kazuhiro Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/282,980

(22) Filed: Oct. 27, 2011

(65) Prior Publication Data
US 2012/0097841 A1 Apr. 26, 2012

Related U.S. Application Data (62) Division of application No. 12/344,905, filed on Dec. 29, 2008, now Pat. No. 8,072,519.

(30) Foreign Application Priority Data

Jan. 10, 2008 (JP) ................................. 2008-002884

(51) Int. Cl.
*H04N 5/335* (2011.01)

(52) U.S. Cl.
USPC ............................ 348/294; 348/301; 348/308

(58) Field of Classification Search
USPC ......... 348/307, 320, 321, 322, 324, 841, 842, 348/308, 294, 301
See application file for complete search history.

(56) References Cited

U.S. PATENT DOCUMENTS

| 5,909,247 | A  | * | 6/1999  | Hosokai et al. | 348/302 |
|-----------|-----|----|---------|----------------|---------|
| 7,633,540 | B2 | * | 12/2009 | Totsuka        | 348/294 |
| 2001/0028392 | A1 | * | 10/2001 | Yamamoto et al. | 348/207 |
| 2004/0160652 | A1 | * | 8/2004  | Kimura et al.  | 358/514 |
| 2005/0057673 | A1 | * | 3/2005  | Shimomura et al. | 348/294 |
| 2006/0007504 | A1 | * | 1/2006  | Inaba et al.   | 358/463 |
| 2006/0262362 | A1 | * | 11/2006 | Murakoshi      | 358/514 |
| 2007/0046803 | A1 | * | 3/2007  | Ahn            | 348/308 |
| 2007/0085921 | A1 | * | 4/2007  | Kitagata et al. | 348/308 |
| 2008/0054230 | A1 | * | 3/2008  | Mabey et al.   | 252/606 |
| 2008/0143862 | A1 | * | 6/2008  | Suwa           | 348/308 |
| 2008/0291290 | A1 | * | 11/2008 | Sonoda et al.  | 348/222.1 |
| 2009/0109312 | A1 |   | 4/2009  | Noda et al.    |         |
| 2009/0167913 | A1 |   | 7/2009  | Takenaka et al. |        |
| 2012/0162484 | A1 | * | 6/2012  | Mo et al.      | 348/241 |

FOREIGN PATENT DOCUMENTS

JP   H09-163236 A   6/1997
JP   2000209506   * 7/2000

* cited by examiner

*Primary Examiner* — Nicholas Giles
*Assistant Examiner* — Abdelaaziz Tissire
(74) *Attorney, Agent, or Firm* — Fitzpatrick, Cella, Harper & Scinto

(57) ABSTRACT

In a solid-state imaging apparatus, if the total read out time of all pixels is shortened when effective pixels are thinned out without thinning out OB pixels, then the rows have different reset time periods, and the problem of uneven charge accumulation time periods arises. An improvement by the present invention is that, if no signals are read out from a part of the rows in an effective pixel region to skip the rows, then the time period in which the rows to be skipped are selected is made shorter than that in which the rows from which signals are read out are selected, and the pixels in the optical black pixel region and those in the effective pixel region are driven by the drive pulses of patterns different from each other.

4 Claims, 12 Drawing Sheets

SOLID-STATE IMAGING APPARATUS, IMAGING SYSTEM, AND DRIVE METHOD OF SOLID-STATE IMAGING APPARATUS

RELATED APPLICATIONS

This is a divisional of application Ser. No. 12/344,905, claims benefit of that application under 35 U.S.C. §120, and claims benefit under 35 U.S.C. §119 of Japanese Patent Application 2008-002884, filed on Jan. 10, 2008. The entire contents of each of the mentioned prior applications are incorporated herein by reference.

BACKGROUND OF THE INVENTION

1. Field of the Invention

The present invention relates to a solid-state imaging apparatus carrying out the operation of skipping a part of effective pixels to read out the part, and an imaging system including the solid-state imaging apparatus.

2. Description of the Related Art

In recent years, video cameras and still cameras, each being mounted with a complementary metal oxide semiconductor (CMOS) sensor superior in reading out signals at high-speed, have been increasing. Moreover, also cameras have been developing to have multiple functions, and sensors are required to perform a plurality of read out methods. The sensors are required, for example, to switch their sensing modes among a still image mode wherein the ratio between the lateral direction and longitudinal direction of a screen is 4 to 3, a high definition (HD) moving image mode wherein the ratio between the lateral direction and longitudinal direction of a screen is 16 to 9, and a moving image mode of the ratio between the lateral direction and longitudinal direction of a screen is 4 to 3, for example, Video Graphics Array (VGA), and to realize electronic zooming. As a means for switching the resolution of an image to be obtained, that is, the number of pixels from which signals are read out, there is a thinning out operation. In the thinning out operation, it is possible to obtain an image having a resolution lower than the maximum resolution of an imaging device by selecting the pixels from which signals are read out every one or a plurality of lines (rows or columns).

Generally, there is a pixel region called an optical black pixel region (hereinafter referred to as an OB region) around an effective pixel region to be used for image formation. The OB region is used for signal correction, such as offset elimination, and the OB region includes the pixels each having a photodiode which is a photoelectric conversion element and is shielded from light. Generally, signal correction using a plurality of pixels in the OB region (hereinafter referred to as OB clamping) is carried out. The pixels in the OB region will hereinafter be referred to as OB pixels. In the OB clamping, signals are read out from the plurality of pixels in the OB region and are averaged. However, if the OB pixels are also thinned out when signals are read out from the effective pixels by the aforesaid thinning out operation, then there is the possibility that noises are not sufficiently reduced.

Against this problem, there is a technique proposed in Japanese Patent Application Laid-Open No. H09-163236. According to Japanese Patent Laid-Open No. H09-163236, OB pixels are read out in a normal read out mode, in which pixels are read out without being thinned out, even when light receiving pixels in the effective pixel region are read out in a thinning out reading out mode, in which pixels are read out by a thinning out operation. In addition, it is described in the publication to drive the light receiving pixels and the OB pixels at different frequencies. Japanese Patent Application Laid-Open No. H09-163236 describes that it is thereby possible to realize an OB clamping operation with high accuracy without increasing the number of the OB pixels even in the thinning out reading out mode.

However, the method of the publication has the following problem.

Generally, in a CMOS sensor used for moving imaging, the charge accumulation time periods of pixels are controlled by rolling shutter operations. In the rolling shutter operations, a row to be reset and a row from which signals are read out are sequentially shifted, and thereby a time period from resetting to reading out is set as an accumulation time period.

Figure 14:
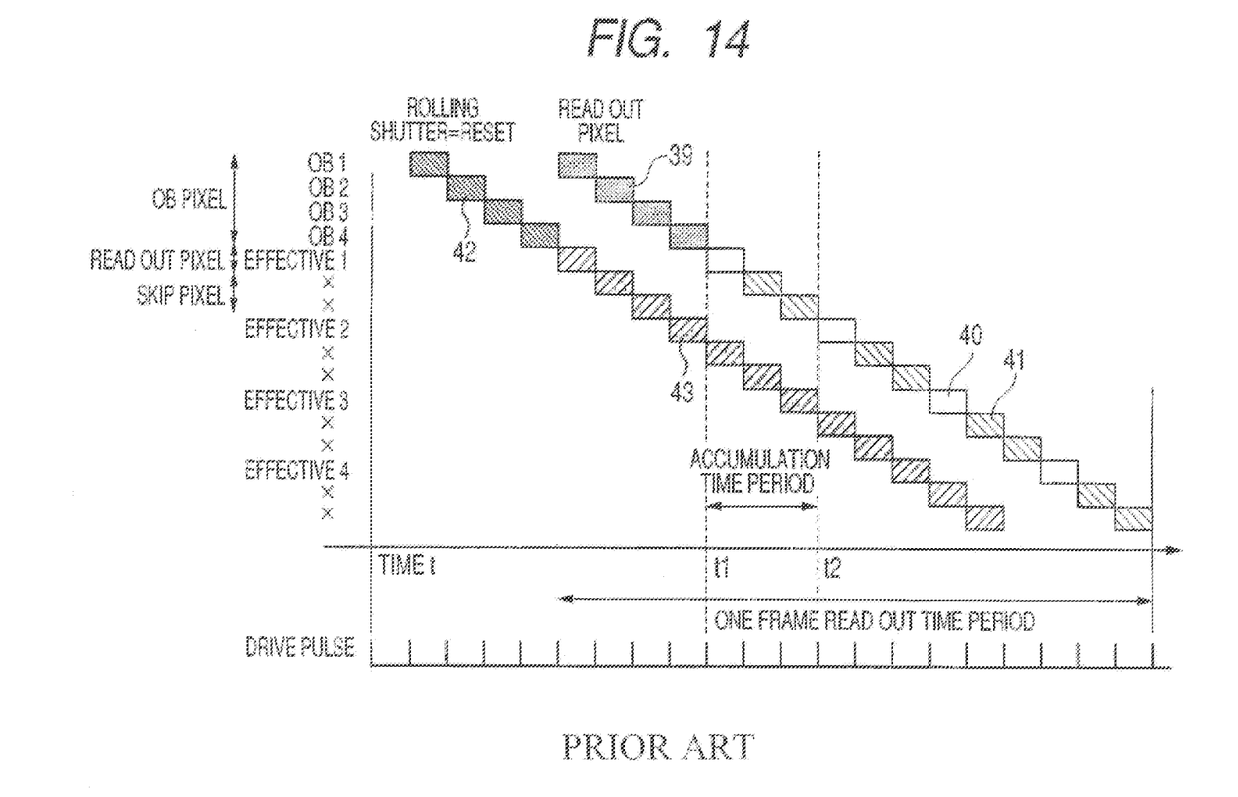
FIG. 14 is a timing diagram in the case where an OB pixel region and an effective pixel region are driven by the same drive pattern and the read out time of a skip row and the read out time of a read out row are set to be the same.

FIG. 14 illustrates the timing at the time of applying the rolling shutter operations to an imaging device including OB pixels on four rows in the upper part thereof and effective pixels on and after a fifth row. The abscissa axis of the graph illustrated in FIG. 14 indicates time, and the ordinate axis thereof indicates the positions of pixel rows. FIG. 14 illustrates OB pixel row reading out time periods 39, effective pixel row reading out time periods 40, effective pixel row skipping time periods 41, during which no signals are read out, that is, the pixels to be thinned out are scanned, OB pixel row resetting time periods 42, and effective pixel row resetting time periods 43. A time period from a time t1 at which the resetting of the effective pixel rows from which signals are read out ends to a time t2 at which reading out is started is the charge accumulation time period of pixels. Because both of the OB region and the effective pixel region are driven by the same drive pulses here, each of the effective pixel row reading out time periods 40 and each of the effective pixel row skipping time periods 41 are the same lengths. Consequently, the charge accumulation time period on each row does not shift from one another.

There is a requirement of shortening the total read out time needed for reading out the signals of all the pixels in order to increase the number of imaged screens per time. It is accordingly conceivable to shorten the effective pixel row skipping time periods 41 in order to shorten the total read out time of all of the pixels, but another problem arises in this case. The charge accumulation time periods, which are set by the rolling shutter operations are different from one another on the respective rows. This problem is caused because the control of reading out signals and the control of carrying out resetting are carried out with the same patterns of drive pulses. Thereby causing the reset time periods of the respective rows to be different from one another to make the charge accumulation time periods uneven.

SUMMARY OF THE INVENTION

The present invention is directed to provide a solid-state imaging apparatus capable of making accumulation time periods equal even if the total read out time of all of the pixels are shortened at the time of reading out OB pixels without thinning out them and reading out effective pixels by thinning out them.

A first aspect of the present invention is to provide a solid-state imaging apparatus comprising: an effective pixel region comprising pixels arranged along a plurality of rows, each pixel including a photoelectric conversion element converting an incident light into an electric charge and accumulating the charge; an optical black pixel region comprising pixels arranged along a plurality of rows, each pixel including a light shielded photoelectric conversion element; a reset control unit for controlling, row by row, by advancing an address, a resetting operation of the electric charges accumulated in the photoelectric conversion elements in the pixels of the effective pixel region and of the optical black pixel region; and a read out control unit for controlling, row by row, by advancing an address, a read out operation of signals from the pixels of the effective pixel region and of the optical black pixel region, wherein an electric charge accumulation time period of the pixel is a time period from an end of the reset operation of the electric charge accumulated in the photoelectric conversion element by the reset control unit until a start of the read out operation of signals from the pixel by the read out control unit, the read out control unit and the reset control unit controls such that, in the effective pixel region, a length of a time period from advancing an address to a row of pixels which the signal is not read out, until advancing the address to an adjacent row of the pixels is shorter than a length of a time period from advancing an address to a row of the pixels from which the signal is read out, until advancing the address to an adjacent row of the pixels; and the read out control unit and the reset control unit controls such that, in the optical black pixel region, a length of a time period from advancing an address to a row of the pixels until advancing an address to an adjacent row of the pixels is the same as the length of the time period from advancing an address to a row of the pixels, from which the signal is read out, until advancing an address to an adjacent row of the pixels in the effective pixel region.

A second aspect of the present invention is to provide a driving method of a solid-state imaging apparatus comprising: an effective pixel region comprising pixels arranged along a plurality of rows, each pixel including a photoelectric conversion element; an optical black pixel region comprising pixels arranged along a plurality of rows, each pixel including a light shielded photoelectric conversion element, wherein an electric charge accumulation time period of the pixel is a time period from a reset of the electric charge accumulated in the photoelectric conversion element until a start of read out of signals from the pixel, the method comprising steps of: addressing such that, in the effective pixel region, a length of a time period of address progressing from addressing the row of pixels, from which the signal is not read out, until addressing adjacent row of the pixels is shorter than a length of a time period of address progressing from addressing the row of pixels, from which the signal is read out, until addressing adjacent row of the pixels; and addressing such that, in the optical black pixel region, a length of a time period of address progressing from addressing the row of pixels until addressing adjacent row of the pixels is the same as the length of the time period of address progressing, in the effective pixel region, from addressing the row of pixels, from which the signal is read out, until addressing adjacent row of the pixels.

According to the present invention, the accumulation time periods can be made to be equal even if the total read out time of all of the pixels is shortened at the time of thinning out effective pixels to read out them without thinning out OB pixels.

Further features of the present invention will become apparent from the following description of exemplary embodiments with reference to the attached drawings.

DESCRIPTION OF THE EMBODIMENTS

First Embodiment

A first embodiment of the present invention will be described with reference to FIGS. 1, 2 and 3.

Figure 1:
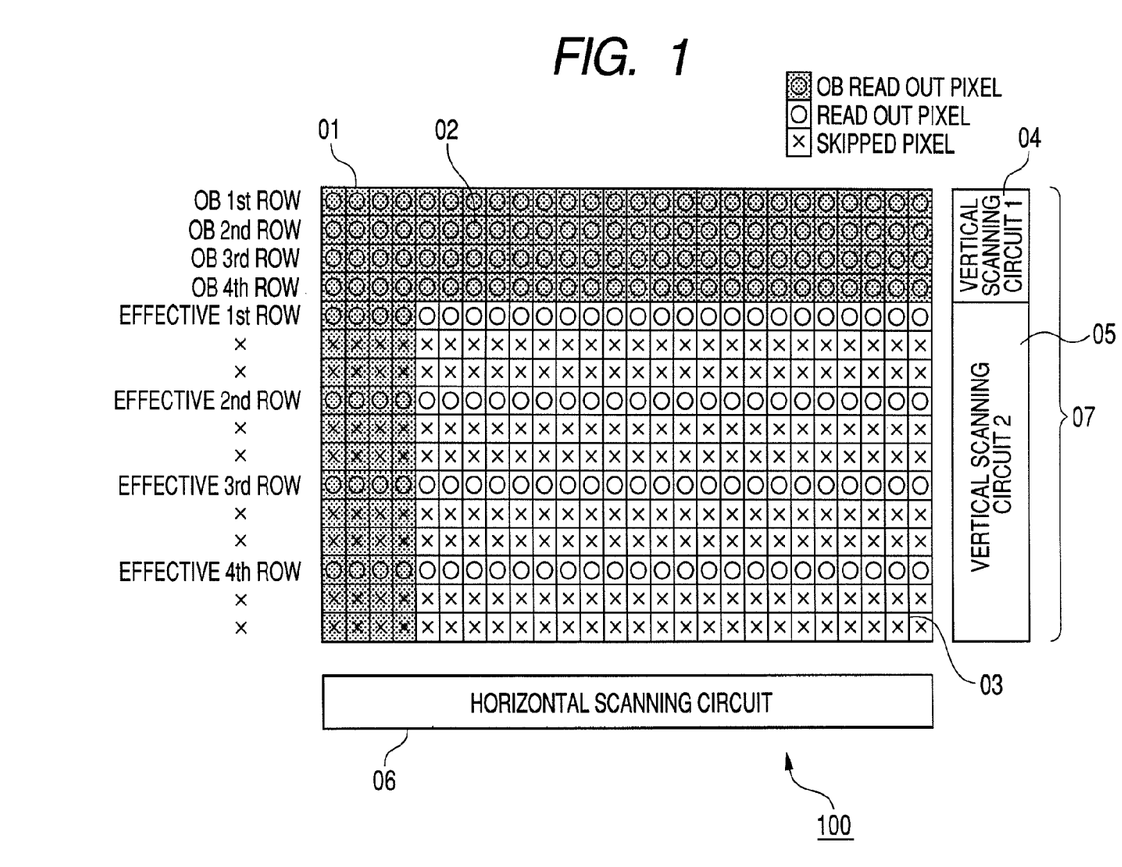
FIG. 1 is a schematic view illustrating a solid-state imaging apparatus according to a first embodiment.

FIG. 1 is a schematic view schematically illustrating a part of the configuration of a solid-state imaging apparatus. The solid-state imaging apparatus 100 includes a pixel region 01, a horizontal scanning circuit 06, and a vertical scanning circuit 07. The pixel region 01 includes an optical black pixel region (hereinafter referred to as OB pixel region 02), in which a plurality of rows of optical black pixels (hereinafter referred to as OB pixels) illustrated by half-tone dot meshing is arranged, and an effective pixel region 03, in which a plurality of rows of effective pixels illustrated by a white ground is arranged. The OB pixels are shielded from light in order to prevent photoelectric conversion elements from converting incident light into electric charges. The vertical scanning circuit 07 includes a vertical scanning circuit 1 (04), which is a first reset control circuit unit scanning the OB pixels every row and a first read out control circuit unit, and a vertical scanning circuit 2 (05), which is a second reset control circuit unit scanning the effective pixels every row and a second read out control circuit unit. The vertical scanning circuits 1 and 2 are configured to be able to advance an address of the rows to be scanned at mutually different timing.

In the present embodiment, a case is shown that uses the solid-state imaging apparatus 100 having the pixel region 01 composed of the OB pixel region 02 including four rows of OB pixels and the effective pixel region 03 including 12 rows of effective pixels, and all of the OB pixels in the OB pixel region 02 are read out and the effective pixels in the effective pixel region 03 is read out every three rows. In FIG. 1, the pixels to be read out are marked by ○ and the pixels to be skipped, that is, the pixels at the addresses where the operations of reading out signals are not carried out and advancing an address to the next row is carried out are marked by '.

Moreover, in FIG. 1, there are OB pixels in the OB pixel region 02 also on the left sides of the respective rows of the effective pixel region 03. These OB pixels are provided in order to correct the variation of the respective rows, and are driven similarly to the pixels in the effective pixel region 03 because the pixel region 01 is control by the row. In the following, the OB pixels provided on the left sides of the respective rows of the effective pixel region 03 will not be considered, and the rows including only the OB pixels will be considered with regard to the OB pixel region 02.

Figure 2:
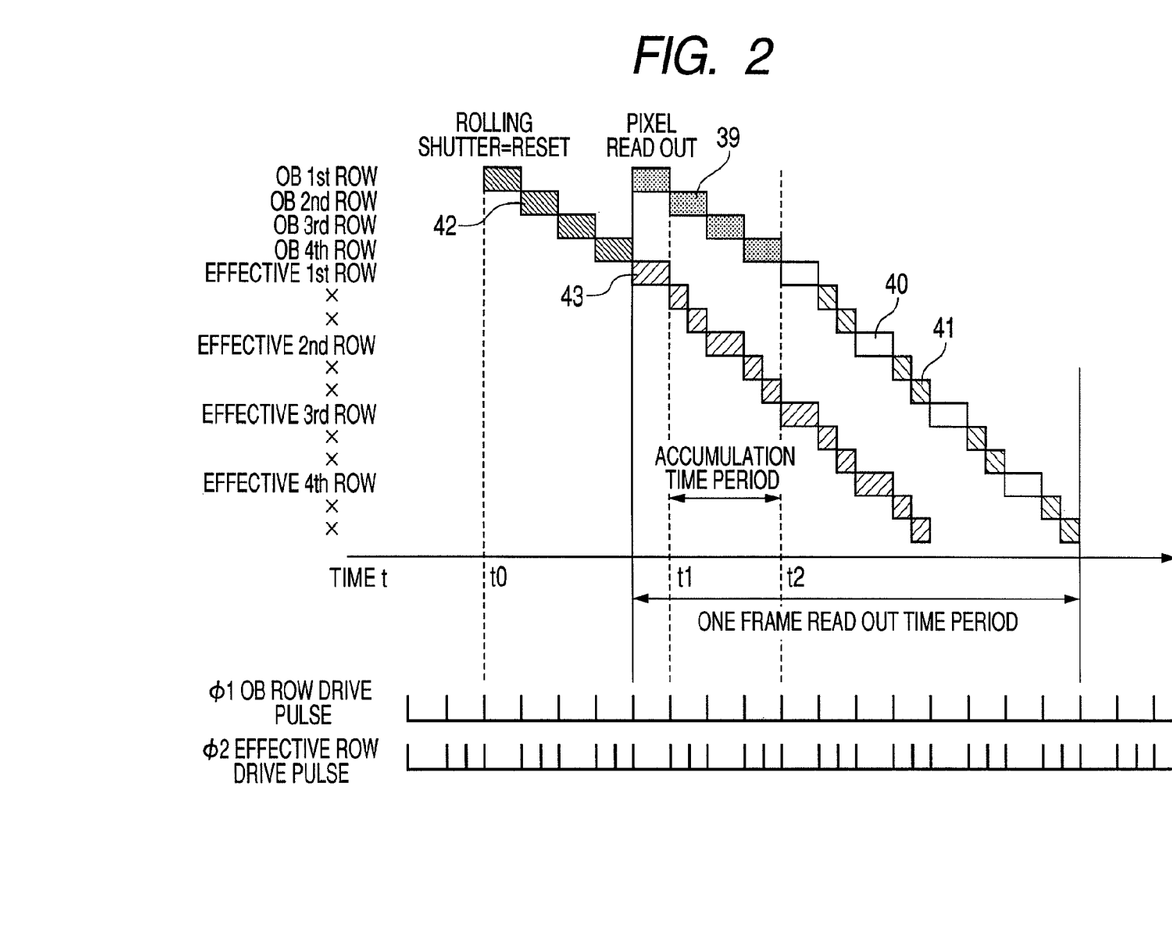
FIG. 2 is a timing diagram for illustrating the driving of the solid-state imaging apparatus according to the first embodiment.

FIG. 2 is an explanatory diagram of a read out method of an operation mode for carrying out the read out method illustrated in FIG. 1. The abscissa axis thereof indicates time t, and the ordinate axis thereof indicates the positions of the pixel rows to be read out, which correspond to the positions of the rows illustrated in FIG. 1. In FIG. 2, also illustrated drive pulses j1 to the OB pixel region 02 to be used for the drive pulses of the vertical scanning circuit 1 (04), and drive pulses j2 to the effective pixel region 03 to be used for the drive pulses of the vertical scanning circuit 2 (05). Although only the rising timings of the drive pulses are illustrated by lines in FIG. 2, the pulses have time widths in actual implementation. The vertical scanning circuits 1 and 2 are configured to send a row to be scanned, that is, to advance an address, in response to a rise of a drive pulse. The control of the charge accumulation time period is carried out by the electronic shutter operation. FIG. 2 illustrates the OB pixel row reading out time periods 39, the effective pixel row reading out time periods 40, the effective pixel row skipping time periods 41, the OB pixel row resetting time periods 42, and the effective pixel row resetting time periods 43. The operation mode of FIG. 2 sets a time period from a start of reading out the first row of the OB pixel region 02 to an end of reading out the last row of the effective pixel region 03 (the end of the last effective pixel row skipping time periods 41 in FIG. 2) as one frame read out time period, and the image for one screen is formed on the basis of the signals read out for the one frame read out time period.

The operation of the present embodiment is now described in detail. First, a reset operation of pixels is started from the first row of the pixel region 01 at the time t0, and then the row to be reset is being shifted in response to the drive pulses of the vertical scanning circuits 1 and 2. In FIG. 2, pixel reading out, which is a read out scan, starts from the first row in the OB pixel region 02 at the timing when rolling shutter reset, which is a reset scan, advances an address from the fourth row in the OB pixel region 02 to the first row in the effective pixel region 03. It is known that the time period from the end of reset of the pixels of each row to the start of read out of the pixels, that is, the charge accumulation time period (accumulation time period), is constant. Incidentally in the present embodiment, the reset operation of a pixel is supposed to indicate the resetting operation of the electric charges accumulated in a photoelectric conversion element.

Figure 3:
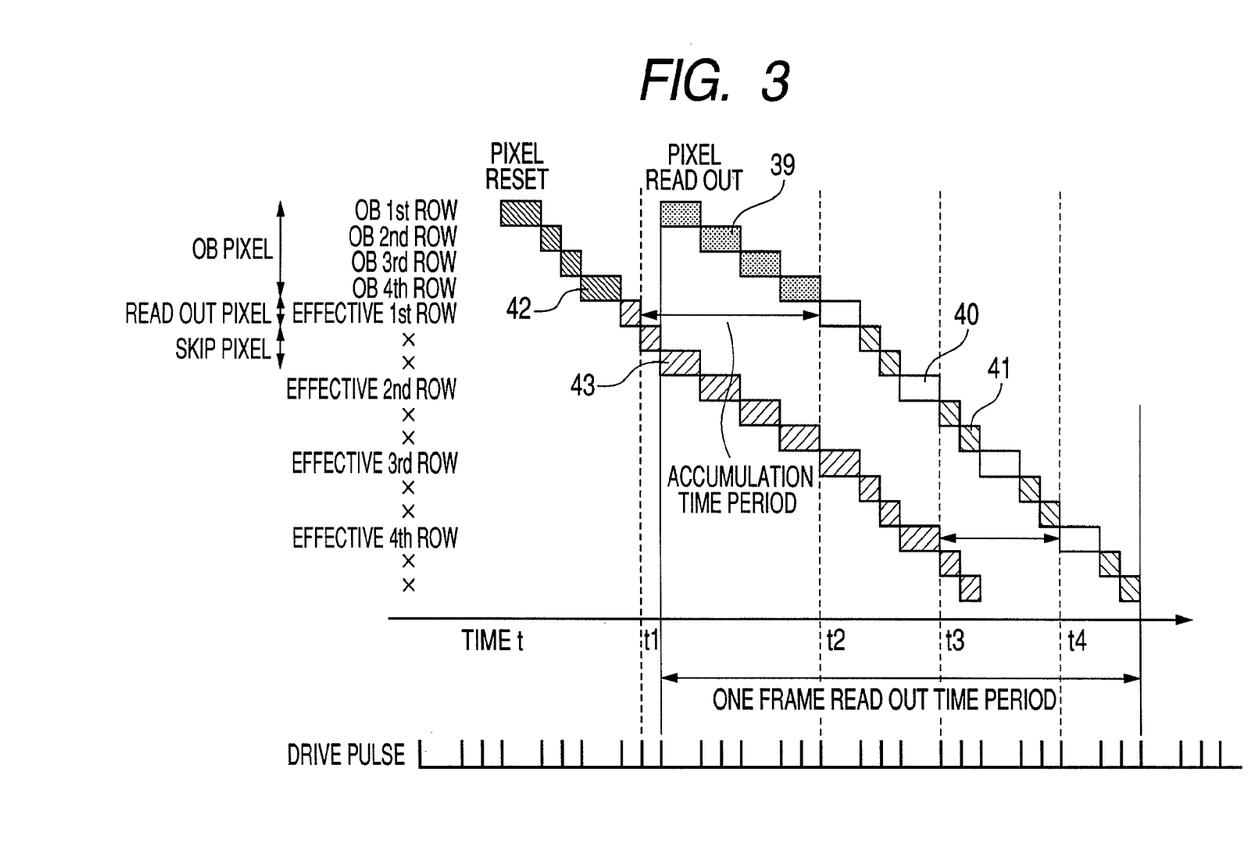
FIG. 3 is a timing diagram for illustrating a comparative example to the driving of the solid-state imaging apparatus according to the first embodiment.

As a comparative example, FIG. 3 illustrates a timing diagram of the case of driving the vertical scanning circuit 1 and the vertical scanning circuit 2 with the same drive pulse patterns, and of shortening each of the effective pixel row skipping time periods 41 than each of the effective pixel row reading out time periods 40. In FIG. 2, each of the effective pixel row skipping time periods 41 is the same length as each of the effective pixel row reading out time periods 40, but in FIG. 3, the vertical scanning circuits 1 and 2 are driven by the same drive pulse patterns, and each of the effective pixel row skipping time periods 41 is shorter than each of the effective pixel row reading out time periods 40. Consequently, the one frame read out time period of FIG. 3 becomes shorter than that of FIG. 2, and the imaging frame rate is improved, for example, in the case of a moving image.

However, because noises are generally reduced by averaging the signals for a plurality of rows of OB pixels, it is required to read out all of the OB pixels without skipping them.

A case of driving the OB pixel region 02 and the effective pixel region 03 with the same drive pulse patterns is examined. If the drive is carried out on the supposition that all of the OB pixel rows are read out, one of the effective pixel row resetting time periods 43 carried out at the same timing as that of one of the OB pixel row reading out time periods 39 is the same length as the OB pixel row reading out time period 39 regardless of whether to read out signals from the row or whether to advance an address without reading out any signals. On the other hand, one of the OB pixel row resetting time periods 42 or one of the effective pixel row resetting time periods 43 carried out at the same timing as that of one of the effective pixel row skipping time periods 41 becomes shorter in accordance with the effective pixel row skipping time period 41. Consequently, an accumulation time period, which is a charge accumulation time period, illustrated by a time period from time t1 to time t2 in FIG. 3 becomes different from the accumulation time period illustrated by a time period from time t3 to time t4 ((t2−t1)>(t4−t3) in this case). If an image is formed on the basis of the signals read out from the pixels different in charge accumulation time periods, then, for example, brightness becomes different in a screen, and especially if the charge accumulation time periods are controlled by the line, then it is conceivable that streaky luminance shading is generated.

Figure 4:
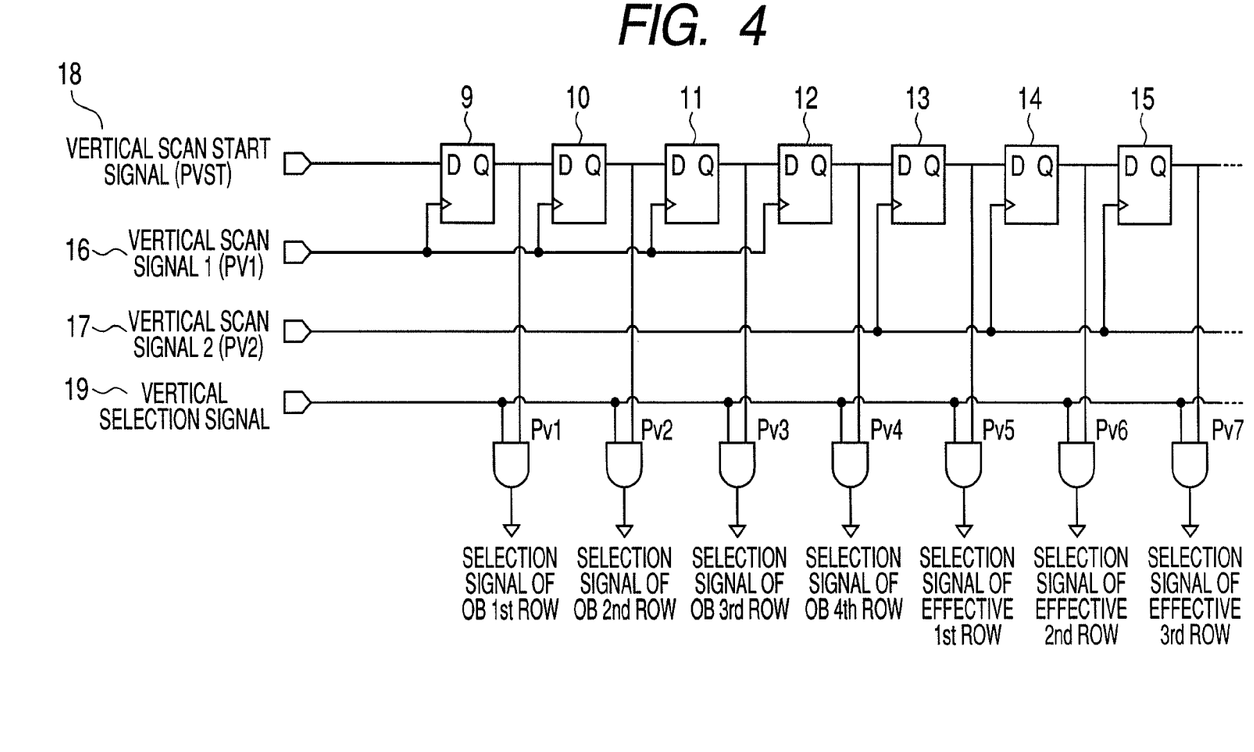
FIG. 4 is a diagram illustrating a configuration example of a vertical scanning circuit according to the first embodiment.

A configuration example of the vertical scanning circuit 07 according to the present embodiment is illustrated in FIG. 4.

Each stage of the vertical scanning circuit 07 is composed of D flip-flops to 15. The flip-flops 9 to 12 each shift to the next stage in response to an input of a vertical scan signal 1 (16), which is a control signal, and the flip-flops 13 to 15 each shift to the next stage in response to an input of a vertical scan signal 2 (17), which is a control signal. Since the vertical scanning circuit 07 is configured in such a way, the D flip-flops 9 to 12 in the anterior part, which correspond to the vertical scanning circuit 1, and the D flip-flops 13 to 15 in the posterior part, which correspond to the vertical scanning circuit 2, can scan pixels in mutually different drive patterns. FIG. 4 also illustrates a vertical scan start signal 18 and a vertical selection signal 19. The use of the vertical scanning circuit 07 enables the timing of advancing an address to be varied between in the OB pixel region 02 and in the effective pixel region 03, and as a result the accumulation time period of each row can be made to be constant.

Although the vertical scanning circuit 07 is illustrated as the one constituting a shift register composed of D flip-flops 9 to 15 as one example here, the vertical scanning circuit 07 can be configured by using clocked inverters or the like to obtain the same effect. Moreover, although FIG. 4 illustrates only the part for carrying out output for seven rows for simplification, there are outputs corresponding to all the rows in the pixel region 01 actually.

Although the first reset control circuit unit and the first read out control circuit unit, and the second reset control circuit unit and the second read out control circuit unit are mutually combined to be one body in the present embodiment, they may be configured to be mutually independent. For example, if the first reset control circuit unit and the first read out control circuit unit are independently configured, then the first reset control circuit unit and the first read out control circuit unit may generate the drive pulses mentioned above on the basis of reset control signals and read out control signals, respectively. The same can be applied to the second reset control circuit unit and the second read out control circuit unit. Moreover, it can be said that the same applies to the other embodiments that will be described later.

The following advantage can be obtained by scanning the OB pixel region 02 and the effective pixel region 03 with the mutually different drive pulse patterns as described above. That is, even if the vertical scanning circuit 2 shortens the time periods for addressing the rows of the pixels from which no signals are read out when the vertical scanning circuit 1 reads out the OB pixel region 02 without thinning out, and the vertical scanning circuit 2 thins out the effective pixel region 03 to read out the pixels in the region 03, it becomes possible to make the charge accumulation time period uniform in each row to be read out while one frame being shortened.

Second Embodiment

A second embodiment according to the present invention will be described with reference to FIGS. 1 and 5.

Figure 5:
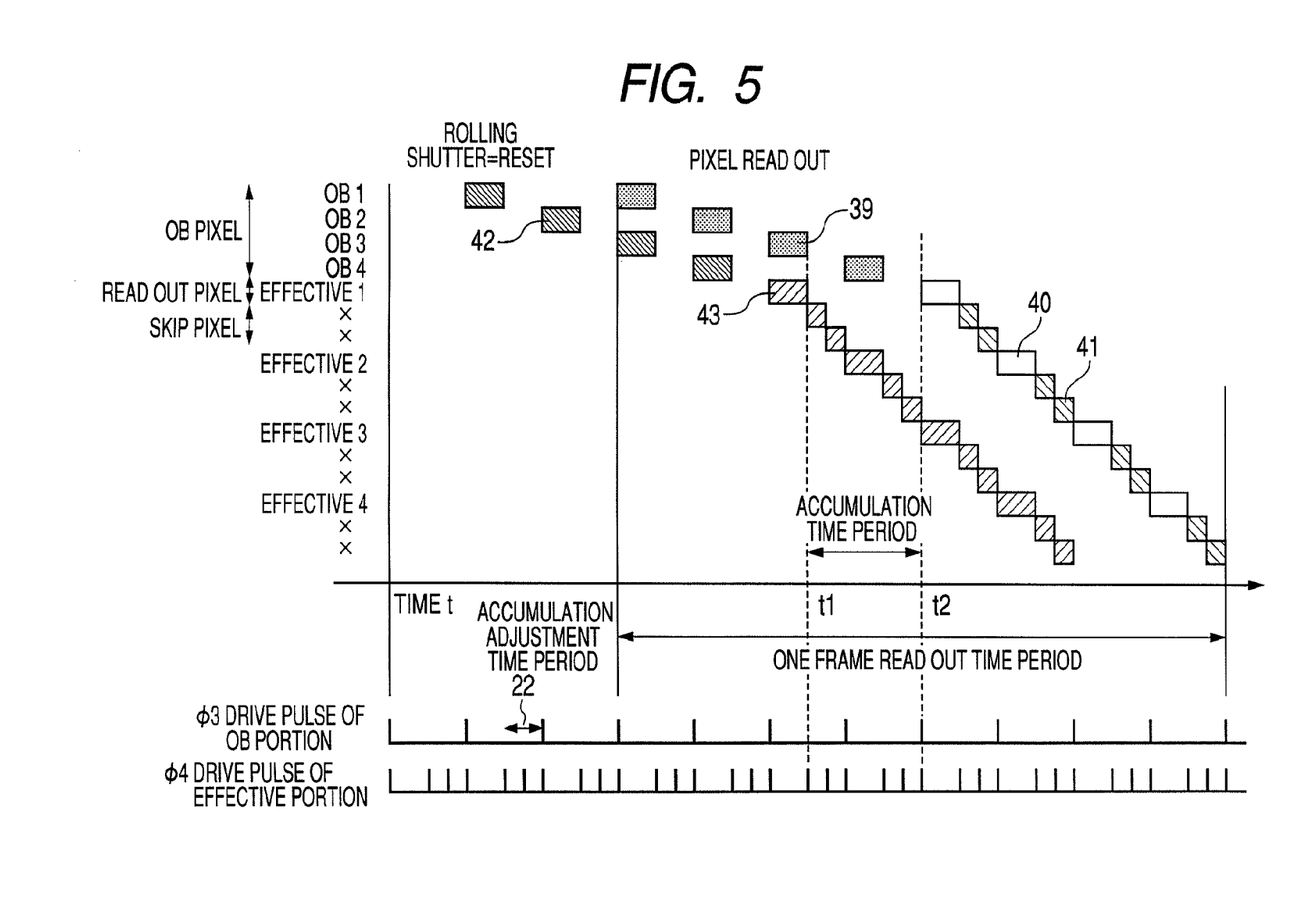
FIG. 5 is a timing diagram for illustrating the driving of a solid-state imaging apparatus according to a second embodiment.

FIG. 5 is a timing diagram illustrating a driving timing according to the present embodiment of the present invention, and the items common to those in FIG. 2 are denoted by the same reference numerals as those in FIG. 2. The present embodiment uses drive pulses j3 of the OB pixel region 02, that is, those of the vertical scanning circuit 1, and the drive pulses j4 of the effective pixel region 03, that is, those of the vertical scanning circuit 2.

The present embodiment provides an accumulation adjustment time period 22 to each of the reset and read out time periods in the OB pixel region 02. This enables the timing of advancing an address of a scan row in the OB pixel region 02 by the vertical scanning circuit 1 to be conformed to the timing of advancing an address of a scan row in the effective pixel region 03 by the vertical scanning circuit 2.

In FIG. 5, the length of the accumulation adjustment time period 22 is set to agree with two rows of the effective pixel row skipping time periods 41. That is, the sum of the accumulation adjustment time period 22 and each of the OB pixel row reading out time periods 39 or the sum of the accumulation adjustment time period 22 and each of the OB pixel row resetting time periods 42 corresponds to the sum of each of the effective pixel row reading out time periods 40 and the time period of two rows of the effective pixel row skipping time periods 41. In other words, the length of the accumulation adjustment time period 22 is required to be the same as the time period from advancing an address from a pixel row from which signals are read out to the next pixel row from which signals are read out with the pixel rows from which not signals are read out put between the both pixel rows from which signals are read out. However, there are actually cases where it is difficult to make both of the time periods completely the same, and then if both the time periods are substantially the same within a range in which the difference between both time periods cannot be recognized in an image formed from the read out signals, no problems arise.

The advancing of addresses of the scan rows in the OB pixel region 02 with providing the accumulation adjustment time period 22 in such a way by the vertical scanning circuit 1 enables the charge accumulation time period of each row to be made to be uniform. Consequently, the second embodiment enables the drive of shortening the time period of reading out one frame without mutually differentiating the charge accumulation time period on each row even if the time periods for resetting skip rows are shortened.

Figure 6:
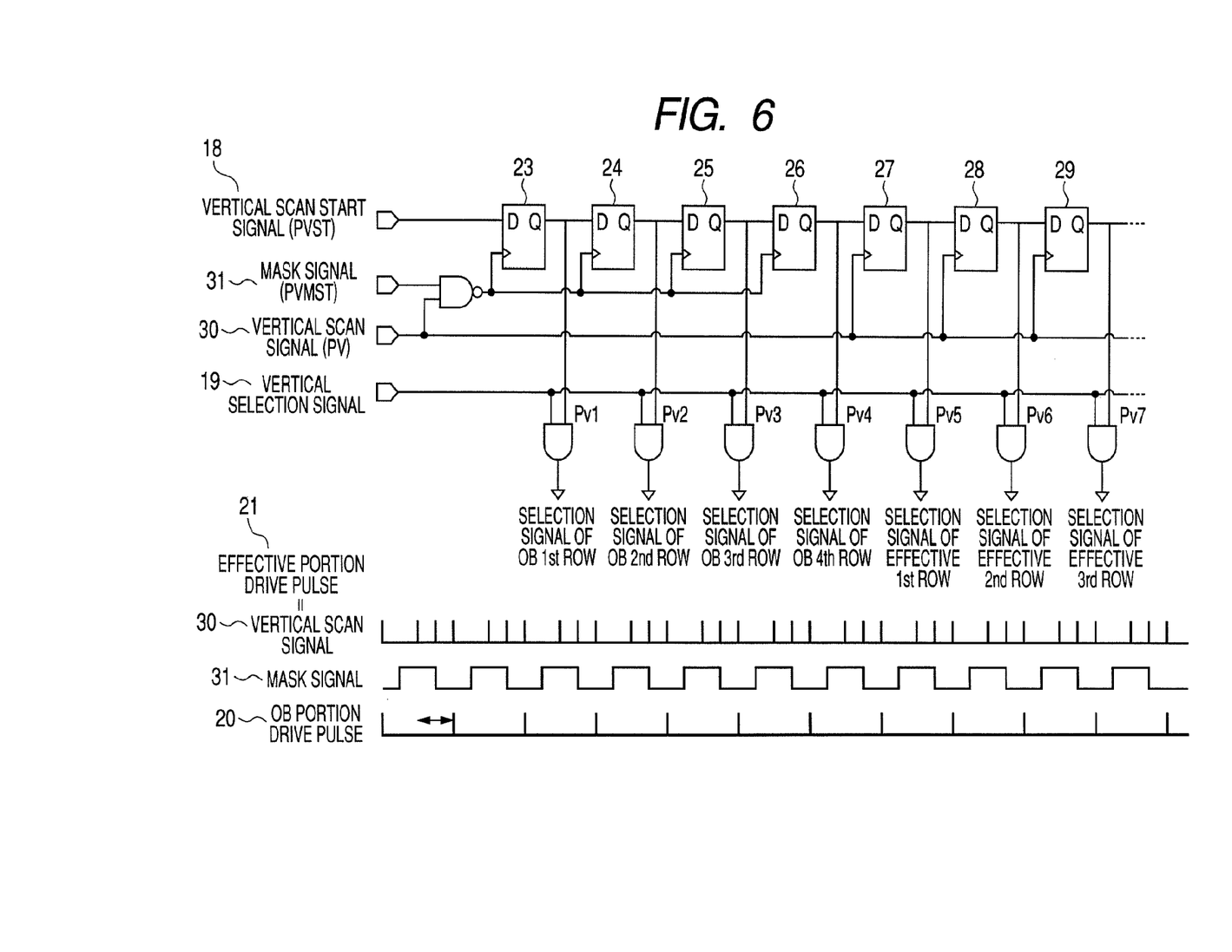
FIG. 6 is a diagram illustrating a configuration example of a vertical scanning circuit according to the second embodiment.

A configuration example of the vertical scanning circuit 07 according to the present embodiment is illustrated in FIG. 6.

Each stage of the vertical scanning circuit 07 is composed of each of D flip-flops 23 to 29. The flip-flops 23 to 26 each shift to the next stage in response to an input of a drive pulse of the OB pixel region 02, which is generated from a vertical scan signal 30 and a mask signal 31, and the flip-flops 27 to 29 each shift to the next stage in response to an input of the vertical scan signal 30, which is a control signal. Since the vertical scanning circuit 07 is configured in such a way, the mask signal 31 takes its high level in a time period in which the accumulation adjustment time period 22 is provided as illustrated in FIG. 6, and consequently the D flip-flops 23 to 26 do not output any drive pulses of the OB pixel region 02. Since the vertical scanning circuit 07 is configured in such a way, the D flip-flops 23 to 26 in the anterior part, which correspond to the vertical scanning circuit 1, and the D flip-flops 27 to 29 in the posterior part, which correspond to the vertical scanning circuit 2, can scan pixels in mutually different drive patterns. The use of the vertical scanning circuit 07 enables the timing of advancing an address to be differentiated between in the scan rows in the OB pixel region 02 and in the scan rows in the effective pixel region 03, and as a result the charge accumulation time period of each row can be made to be constant. Moreover, it can be known that the drive pulses to be supplied to the pixels are generated on the basis of one control signal from FIG. 6.

Although the vertical scanning circuit 07 is illustrated as a shift register composed of D flip-flops 23 to 29 as one example, the vertical scanning circuit 07 can be configured by using clocked inverters or the like to obtain the same effect. Moreover, although FIG. 6 illustrates only the part for carrying out output for seven rows for simplification, there are outputs corresponding to all the rows in the pixel region 01 in an actual implementation.

As described above, the provision of the accumulation adjustment time period 22 enables advancing an address of the rows to be scanned by the drive pulse patterns mutually different in the OB pixel region 02 and in the effective pixel region 03. Thereby allowing the charge accumulation time period to be uniform in each row, even if the vertical scanning circuit 2 shortens the time periods for addressing the rows of the pixels from which no signals are read out when the vertical scanning circuit 1 reads out the OB pixel region 02 without thinning out the pixels and the vertical scanning circuit 2 thins out the effective pixel region 03 to read out the pixels in the region 03.

Third Embodiment

A third embodiment of the present invention will be described with reference to FIGS. 7 and 8.

Figure 7:
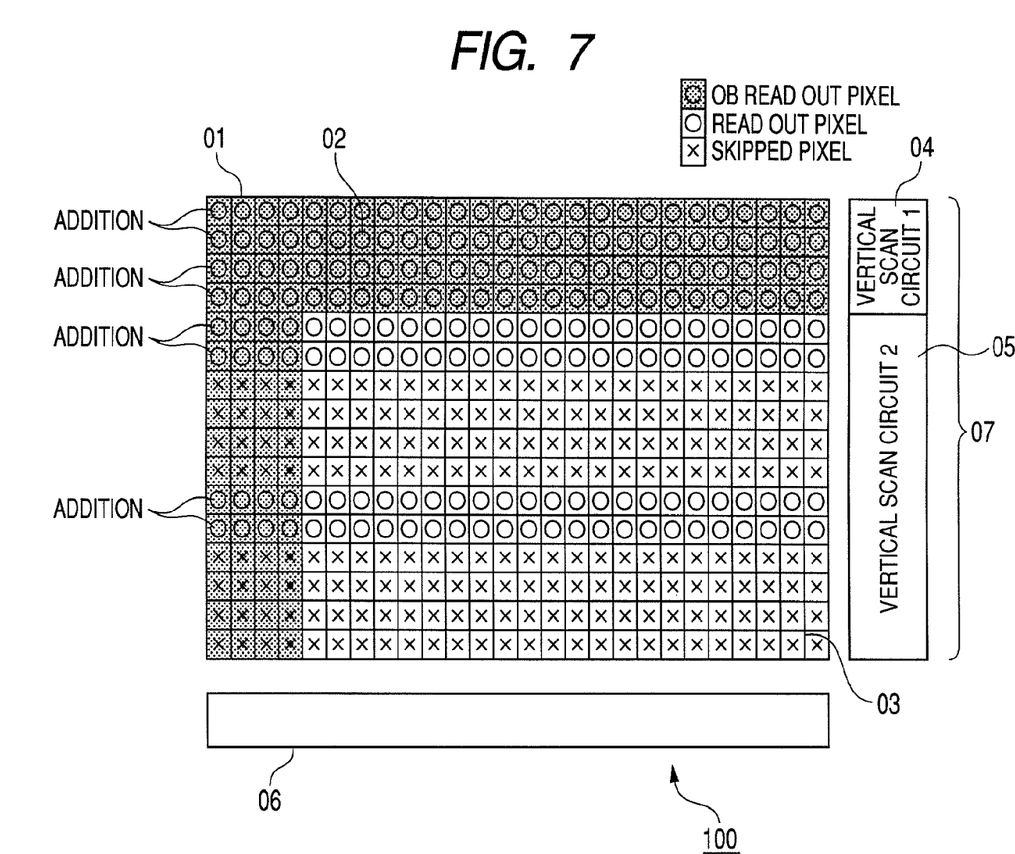
FIG. 7 is a schematic view illustrating a solid-state imaging apparatus according to a third embodiment.

FIG. 7 is a schematic view schematically illustrating a part of the configuration of a solid-state imaging apparatus of the present embodiment. The same components as those of FIG. 1 are denoted by the same reference numerals as those of FIG. 1. In the present embodiment, the following case will be described: two rows adjacent to each other in a vertical direction, that is, every two pixels, are read out to be added to each other in the OB pixel region 02; two rows adjacent to each other in a vertical direction, that is every two pixels, are read out to be added to each other in the effective pixel region 03; and four rows between the two sets of two readout pixel rows in the effective pixel region 03 are skipped. In FIG. 7, the pixels to be read out are marked by ○, and the pixels at the addresses where the operations of reading out signals are not carried out and only advancing an address to the next row is carried out are marked by '.

Moreover, in FIG. 7, there are OB pixels in the OB pixel region 02 also on the left sides of the respective rows of the effective pixel region 03. These OB pixels are provided in order to correct the variation of the respective rows, and are driven similarly to the pixels in the effective pixel region 03 because the pixel region 01 is control by the row. In the following, the OB pixels provided on the left sides of the respective rows of the effective pixel region 03 will not be considered, and the rows including only the OB pixels will be considered with regard to the OB pixel region 02.

Figure 8:
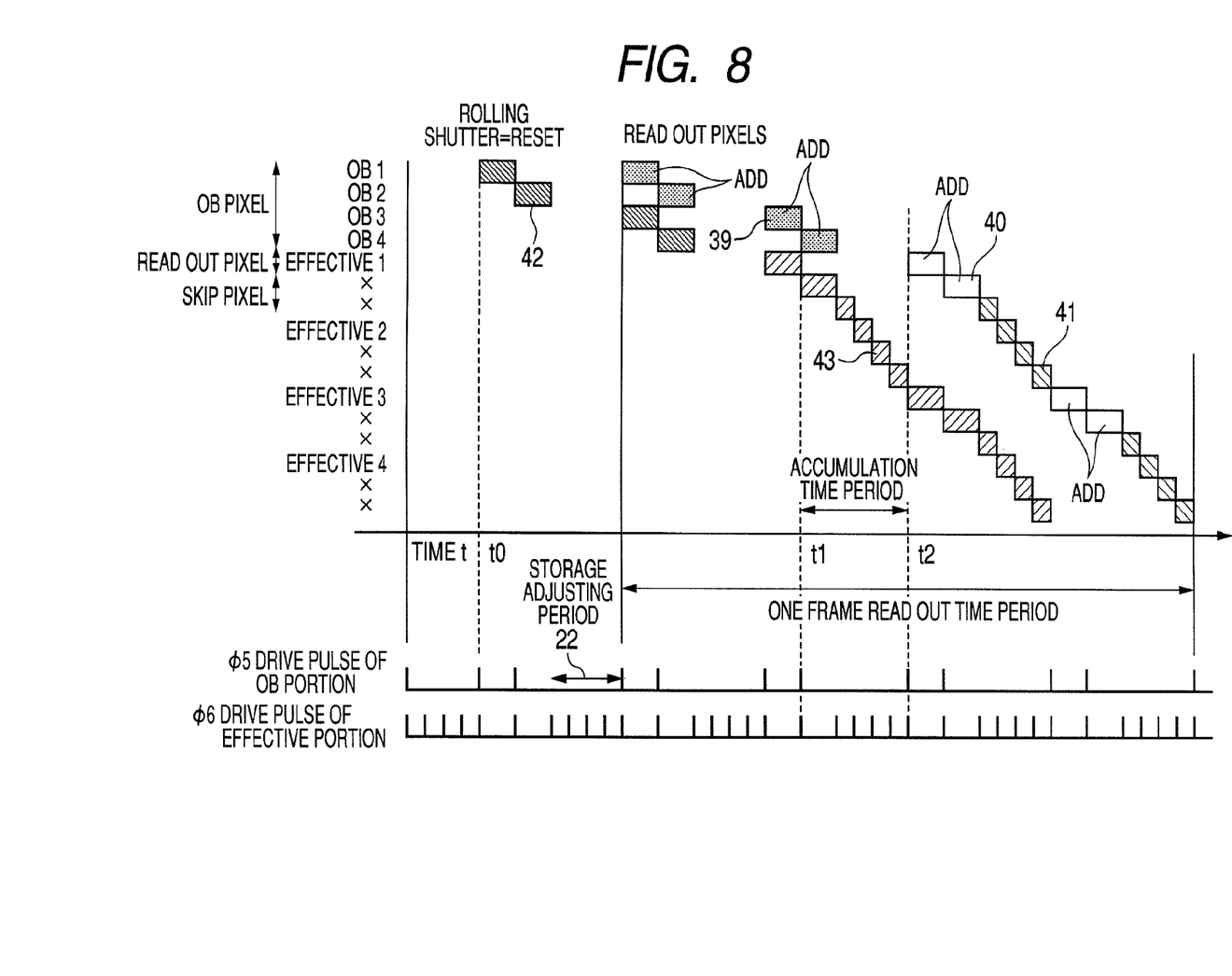
FIG. 8 is a timing diagram for illustrating the driving of the solid-state imaging apparatus of the third embodiment.

FIG. 8 is an explanatory diagram of a read out method of an operation mode for carrying out the read out method illustrated in FIG. 7. The abscissa axis thereof indicates time t, and the ordinate axis thereof indicates the positions of the pixel rows to be read out, which correspond to the positions of the rows illustrated in FIG. 7. In FIG. 8, also illustrated drive pulses j5 to the OB pixel region 02 to be used for the drive pulses of the vertical scanning circuit 1, and drive pulses j6 to the effective pixel region 03 to be used for the drive pulses of the vertical scanning circuit 2. Although only the rising timings of the drive pulses are illustrated by lines in FIG. 8, the pulses have time widths in actual implementation. The vertical scanning circuits 1 and 2 are configured to shift a row to be scanned in response to a rise of a drive pulse.

In the present embodiment, first, a reset operation of pixels is started from the first row of the pixel region 01 at the time t0, and then the address of the row to be reset is being advanced in response to the drive pulses of the vertical scanning circuits 1 and 2. In FIG. 8, pixel reading out, which is a read out scan, starts from the first row in the OB pixel region 02 at the timing when rolling shutter reset, which is a reset scan, advances an address from the second row in the OB pixel region 02 to the third row in the OB pixel region 02. It is known that the time period from the end of reset of the pixels of each row to the start of read out of the pixels, that is, the charge accumulation time period, is constant.

In a read out scan, signals for two rows are sequentially output and are added to each other in any portion in the solid-state imaging apparatus. For example, it is conceivable that at least two rows of line memories holding the signals read out from the pixels in each row are provided, and that the signals held in the line memories are added to each other to be output to the outside of the solid-state imaging apparatus.

In the present embodiment, signals for consecutive two rows are sequentially read out to be added to each other in any portion in the solid-state imaging apparatus, and the signals for the subsequent four rows are not read out and an address is advanced. At this time, the accumulation adjustment time period 22 is provided similarly to the reset scan to conform the timing of shifting a scan row in an optical black pixel row to the timing of shifting a scan row in an effective pixel row from which signals are read out. It can be known that the signal accumulation time period, which is the time period from resetting to reading out in each row, is made to be uniform as illustrated in the accumulation time periods in FIG. 8.

As described above, according to the present embodiment, even if complicated operations, such as two pixel addition in the OB pixel region 02 and two row addition and four line skipping in the effective pixel region 03, are carried out, the signal accumulation time period in each row can be made to be uniform.

Incidentally, either of the types of the configurations of the vertical scanning circuit 07 of the one to input different drive pulses into the solid-state imaging apparatus as described in the first embodiment and the one to generate the drive pulses from a mask signal as described in the second embodiment enables the obtainment of the aforesaid advantages of the present embodiment.

As described above, by providing the accumulation adjustment time period 22, the following advantage can be obtained by advancing an address of the rows to be scanned by the drive pulse patterns mutually different in the OB pixel region 02 and in the effective pixel region 03. That is, even if the vertical scanning circuit 2 shortens the time of reading out the skip rows when the vertical scanning circuit 1 reads out the OB pixel region 02 without thinning out the rows in the region 02 and the vertical scanning circuit 2 reads out the pixels in the effective pixel region 03 by thinning out the rows in the region 03, it becomes possible to make the signal accumulation time period uniform in each row with the read out time of one frame being shortened.

Fourth Embodiment

Figure 9:
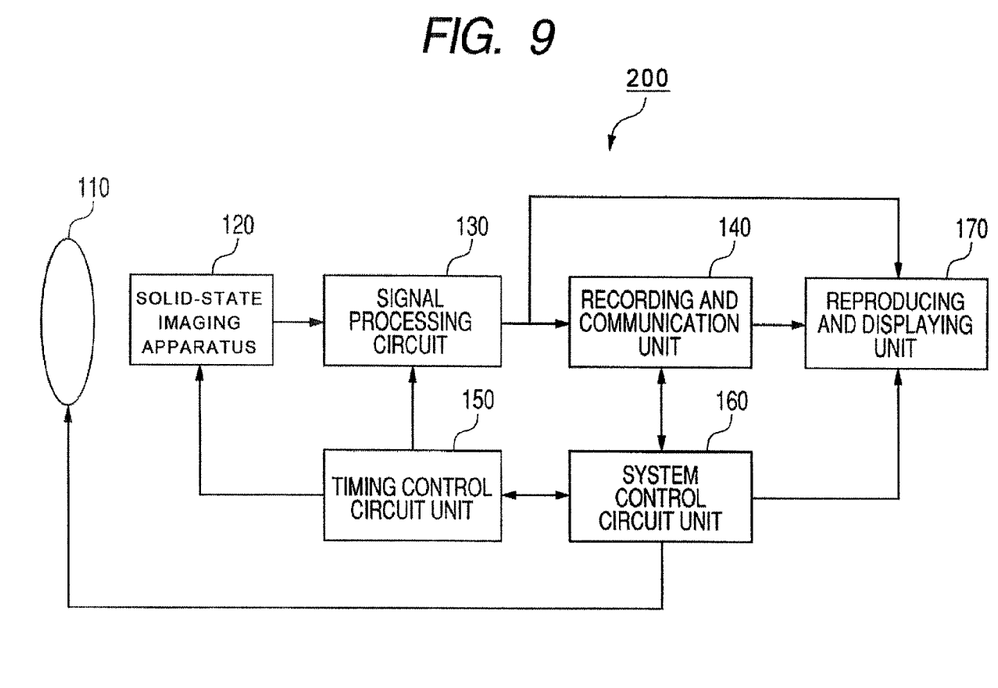
FIG. 9 is a schematic view illustrating an imaging system according to a fourth embodiment.

Next, the outline of an imaging system according to the present embodiment will be described with reference to FIG. 9.

An imaging system 200 includes, for example, an optical unit 110, the solid-state imaging apparatus 120, a signal processing circuit 130, a recording and communication unit 140, a timing control circuit unit 150, a system control circuit unit 160, and a reproducing and displaying unit 170.

The optical unit 110, which is an optical system, such as a lens, forms an image of a subject by carrying out the image formation of the light from the subject on the pixel unit, in which a plurality of pixels are two-dimensionally arranged, of the solid-state imaging apparatus 120. The pixel unit includes the aforesaid effective pixel region 03. The solid-state imaging apparatus 120 outputs a signal according to the light formed as an image on the pixel unit at the timing based on the signal from the timing control circuit unit 150.

The signal output from the solid-state imaging apparatus 120 is input into the signal processing circuit 130, which is a signal processing unit, and the signal processing circuit 130 carries out the processing such as AD conversion to the input electric signal in conformity with a method defined by a program or the like. The signal obtained by the processing of the signal processing circuit 130 is transmitted to the recording and communication unit 140 as image data. The recording and communication unit 140 transmits a signal for forming an image to the reproducing and displaying unit 170, and makes the reproducing and displaying unit 170 reproduce and display a moving image or a still image. The recording and communication unit 140 also receives a signal from the signal processing circuit 130 to carry out communication with the system control circuit unit 160 as well as to carry out the operation of recording a signal for forming an image on a not illustrated recording medium.

The system control circuit unit 160 collectively controls the operation of the imaging system, and controls the drives of the optical unit 110, the timing control circuit unit 150, the recording and communication unit 140, and the reproducing and displaying unit 170. Moreover, the system control circuit unit 160 is equipped with, for example, a not illustrated recording device, which is a recording medium, and records a program necessary for controlling the operation of the imaging system.

The timing control circuit unit 150 controls the drive timing of the solid-state imaging apparatus 120 and the signal processing circuit 130 on the basis of the control by the system control circuit unit 160, which is a control unit.

(Others)

Figure 10:
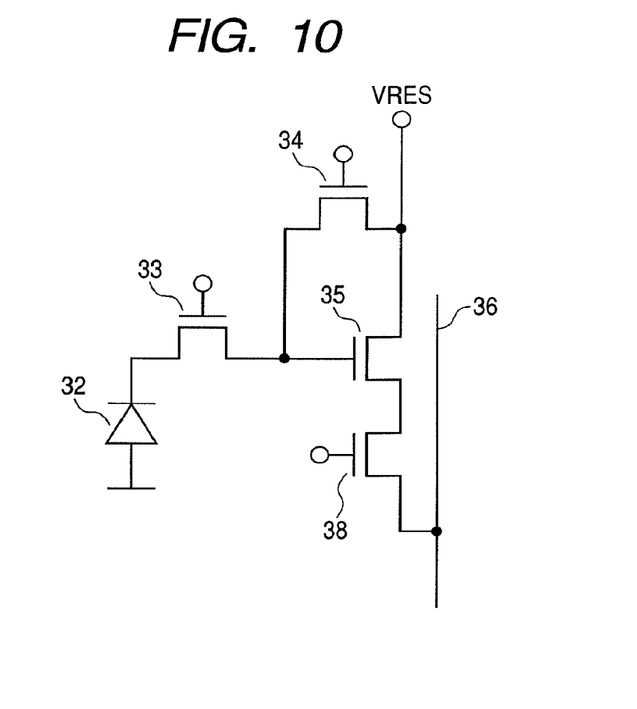
FIG. 10 is a diagram illustrating a configuration example of a pixel.

In the present invention, the configuration of the pixels does not especially matter. An example of the configuration is illustrated in FIG. 10. The configuration includes a photodiode 32, which is a photoelectric conversion element, an amplification transistor 35 outputting a signal according to the electric potential at the gate thereof, which is the control electrode thereof, to a vertical output line 36 through the source of the amplification transistor 35, which is the main electrode thereof, a transfer transistor 33 for transferring the charges generated in the photodiode 32 to the gate of the amplification transistor 35, a reset transistor 34 for resetting the gate of the amplification transistor 35 and the photodiode 32, and a selection transistor 38 for selecting a row. A signal of a selected row can be taken out from the pixel illustrated in FIG. 10 to the vertical output line 36 with the selection transistor 38.

Figure 11:
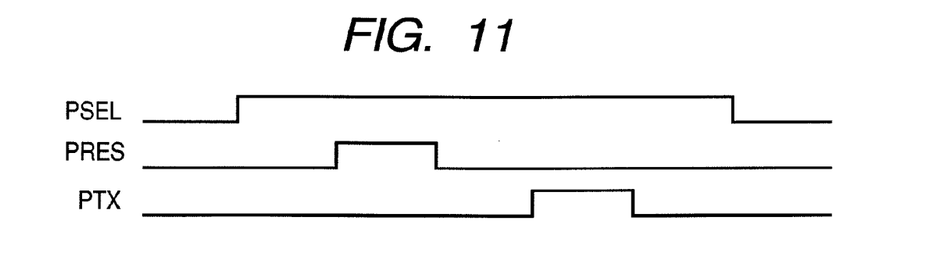
FIG. 11 is a timing diagram illustrating the driving of the pixel of FIG. 10.

Concrete operation timing in the read out pixel is illustrated in FIG. 11. A selection signal PSEL is supplied to the selection transistor 38, and the amplification transistor 35 and a not illustrated constant current source provided to the vertical output line 36 constitute a source follower circuit during a time period when the selection signal PSEL is at its high level. A reset signal PRES is supplied to the reset transistor 34. The floating diffusion (FD) portion of the amplification transistor 35, which is the gate thereof, is reset during a time period when both of the selection signal PSEL and the reset signal PRES are their high levels, and the electric potential according to the gate potential of the amplification transistor 35 at this time appears on the vertical output line 36. After the reset signal PRES is turned to its low level, a transfer signal PTX, which is supplied to the transfer transistor 33, is turned to its high level, and the transfer transistor 33 is switched from its non-conducting state to its conducting state. The charges accumulated in the photodiode 32 are thereby transferred to the FD portion, and the electric potential according to the electric potential of the FD portion appears on the vertical output line 36. After that, the transfer signal PTX is turned to its low level, followed by the transition of the selection signal PSEL to its low level. Thus, the read out operation is completed. Incidentally, although the operation of reading out a signal has been described here, if reset scan is carried out, the reset signal PRES and the transfer signal PTX are simultaneously turned to their high levels, and thereby allowing the charges accumulated in the photodiode 32 to be reset.

Figure 12:
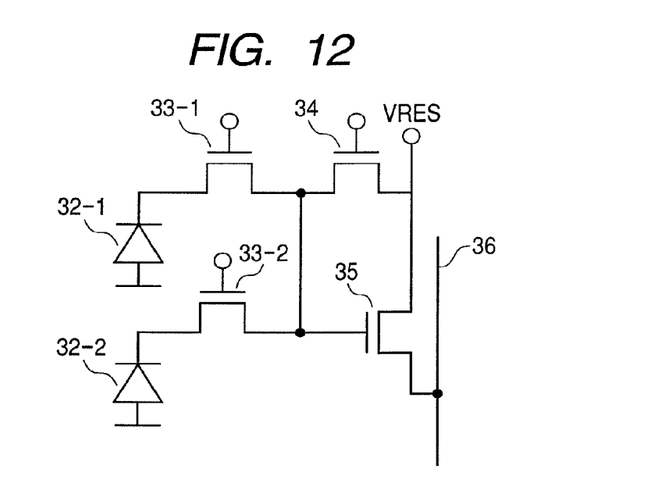
FIG. 12 is a diagram illustrating another configuration example of a pixel.

Next, a configuration example of the so-called two pixels sharing to share a FD portion between two photodiodes is illustrated in FIG. 12. The same components as those of FIG. 10 are denoted by the same reference numerals as those of FIG. 10, and their descriptions will be omitted. Incidentally, a not illustrated constant current source, which constitutes a source follower together with the amplification transistor 35, is provided to the vertical output line 36 as in FIG. 10. In order to select a row from which a signal is read out in the pixel of FIG. 12, the FD portion of the selected row is set to high electric potential and the other FD portions of the non-selected rows are set to low electric potential. Thereby allowing the amplification transistor 35 on the selected row to be turned on, and the amplification transistors 35 on the non-selected rows to be turned off. The signal of the selected row can be thus taken out to the vertical output line 36. This configuration can be considered as two pixels because two photodiodes exist. Since the amplification transistor 35 and the reset transistor 34 are shared, the number of transistors per pixel decreases, and consequently this configuration has an advantage of improving the aperture ratio of a pixel. Incidentally, although the so-called two pixel sharing type circuit to share a FD portion between two photodiodes has been illustrated here, a four pixel sharing type circuit to share a FD portion among four photodiodes and the other sharing type configurations to share a FD portion among the other number of photodiodes may be used.

Figure 13:
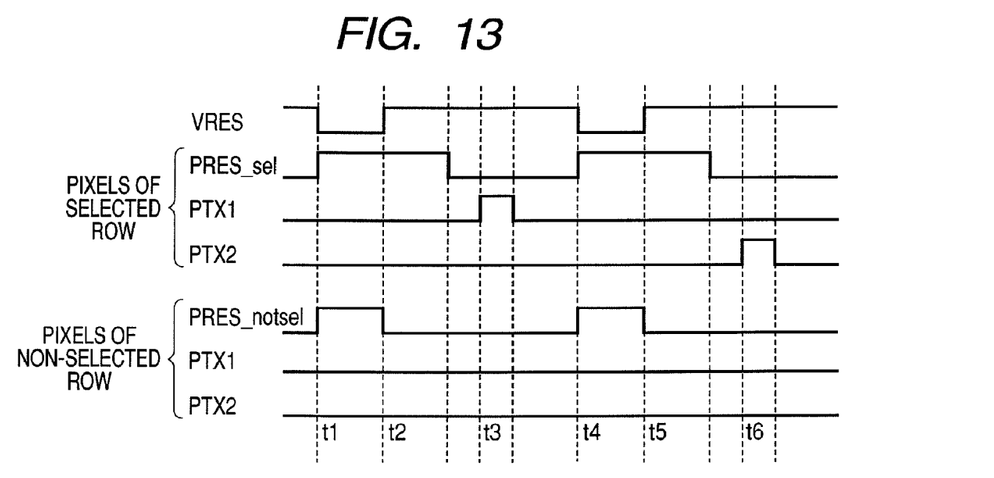
FIG. 13 is a timing diagram illustrating the driving of the pixel of FIG. 12.

Concrete timing at the time of carrying out a read out scan is illustrated in FIG. 13. The upper part of FIG. 13 indicates the operation of a selection pixel from which a signal is read out, and the lower part of FIG. 13 shows the operation of a non-selected pixel from which no signal is read out. In FIG. 13, a voltage VRES is supplied to a terminal VRES of the circuit in FIG. 12. A signal PRES_sel is supplied to the reset transistor 34 in a pixel on a selected row, and a signal PRES_notsel is supplied to the reset transistor 34 in a pixel on a non-selected row. Moreover, transfer signals PTX1 and PTX2 are supplied to transfer transistors 33-1 and 33-2, respectively.

First, the signals PRES_sel and PRES_notsel are turned to their high levels to the selected row and the non-selected row, respectively, at the time t1, and the voltage supplied from the terminal VRES is switched to the low level (hereinafter referred to as level VRES_L). Thereby, the FD portions of both of the selected row and the non-selected row are turned to the level VRES_L, and the amplification transistor 35 is turned off.

At the time t2, the signal PRES_notsel is turned to the low level, and the FD portion is separated from the power source terminal VRES. At the same time the signal supplied from the terminal VRES is switched to a high level (hereinafter referred to as level VRES_H). At this time, since the signal PRES_sel is the high level, the amplification transistor 35 on the selected row is turned on. Therefore, the pixel on the selected row becomes the state in which the signal charged in the pixel can be read out.

At the time t3, the transfer signal PTX1 is turned to the high level, and then the charges accumulated in the photodiode 32-1 are transferred to the FD portion, and the electric potential according to the amount of the charges appears on the vertical output line 36.

In a time period from the time t4 to the time t6, the operation similar to that in the time period from the time t1 to the time t3 is repeated, but the operation in the time period from the time t4 to the time t6 is different from that in the time period from the time t1 to the time t3 in that the transfer signal PTX2 is turned to the high level at the time t6.

Incidentally, on the non-selected row, the transfer signals PTX1 and PTX2 are kept to the low level.

Moreover, if the photodiodes 32-1 and 32-2 are reset, the operation of turning the signals to be supplied to the reset transistor 34 and the transfer transistors 33-1 and 33-2 to the high level at the same time is carried out.

By the operation described above, the operation of reading signals from the two pixel sharing type pixels can be carried out. The timing illustrated here is exemplary timing, and the timing of the present invention is not limited to this timing.

Although the photoelectric conversion elements on the pixel rows from which no signals are read out are also reset in the embodiment mentioned above, no reset operations to those pixel rows may be carried out, and only advancing addresses may be performed to those rows to achieve further speeding up. However, in that case, no reset and no read out are carried out, and consequently there is the possibility of the overflowing of the charges accumulated in the photoelectric conversion elements to leak into the surrounding pixels.

Accordingly, it is preferable to reset also the pixels from which no signals are read out from the point of view of image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-002884, filed Jan. 10, 2008, which is hereby incorporated by reference herein in its entirety.

What is claimed is:

1. A solid-state imaging apparatus comprising:
   an optical black pixel region comprising pixels arranged in a plurality of rows;
   an effective pixel region comprising pixels arranged in a plurality of rows, wherein one of said effective pixel region and said optical black region is arranged above the other in the vertical direction; and
   a read-out control unit which
      performs in parallel a read out scan of said optical black pixel region and and a reset scan of said effective pixel region, and
      controls the read out such that a density of rows of the pixels of said effective pixel region from which signals are read out with respect to all the pixels of said effective pixel region is lower than a density of rows of the pixels of said optical black pixel region from which signals are read out with respect to all the pixels of said optical black pixel region, and a scan period of a pixel of said effective pixel region from which a signal is not read out is shorter than a scan period of a pixel of said effective pixel region from which a signal is read out.

2. The solid-state imaging apparatus according to claim 1, wherein said read-out control unit controls the reset and the read out, such that a length of an accumulation period of the pixels in said optical black pixel region is equal to a length of an accumulation period of the pixels in said effective pixel region.

3. A driving method of a solid-state imaging apparatus, which comprises an optical black pixel region comprising pixels arranged in a plurality of rows and an effective pixel region comprising pixels arranged in a plurality of rows, wherein one of the effective pixel region and the optical black region is arranged above the other in the vertical direction, the method comprising steps of:

conducting, in parallel, a read out scan of the optical black pixel region and and a reset scan of the effective pixel region; and controlling the read out such that a density of rows of the pixels of the effective pixel region from which a signal is read out with respect to the entire pixels of the effective pixel region is lower than a density of rows of the pixels of the optical black pixel region from which a signal is read out with respect to the entire pixels of the optical black pixel region, and a scan period of a pixel of the effective pixel region from which a signal is not read out is shorter than a scan period of a pixel of the effective pixel region from which a signal is read out.

4. The driving method according to claim 3, wherein, in said conducting and controlling steps, a length of an accumulation period of the pixels in the optical black pixel region is equal to a length an accumulation period of the pixels in the effective pixel region.

\* \* \* \* \*